May 27, 1930.   S. L. KIDD   1,759,854
CULTIVATOR
Filed April 5, 1928   2 Sheets-Sheet 2
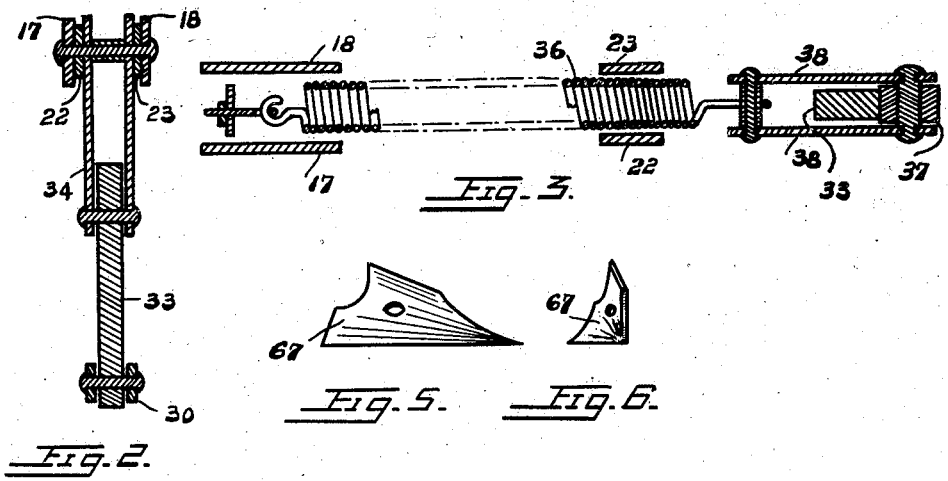
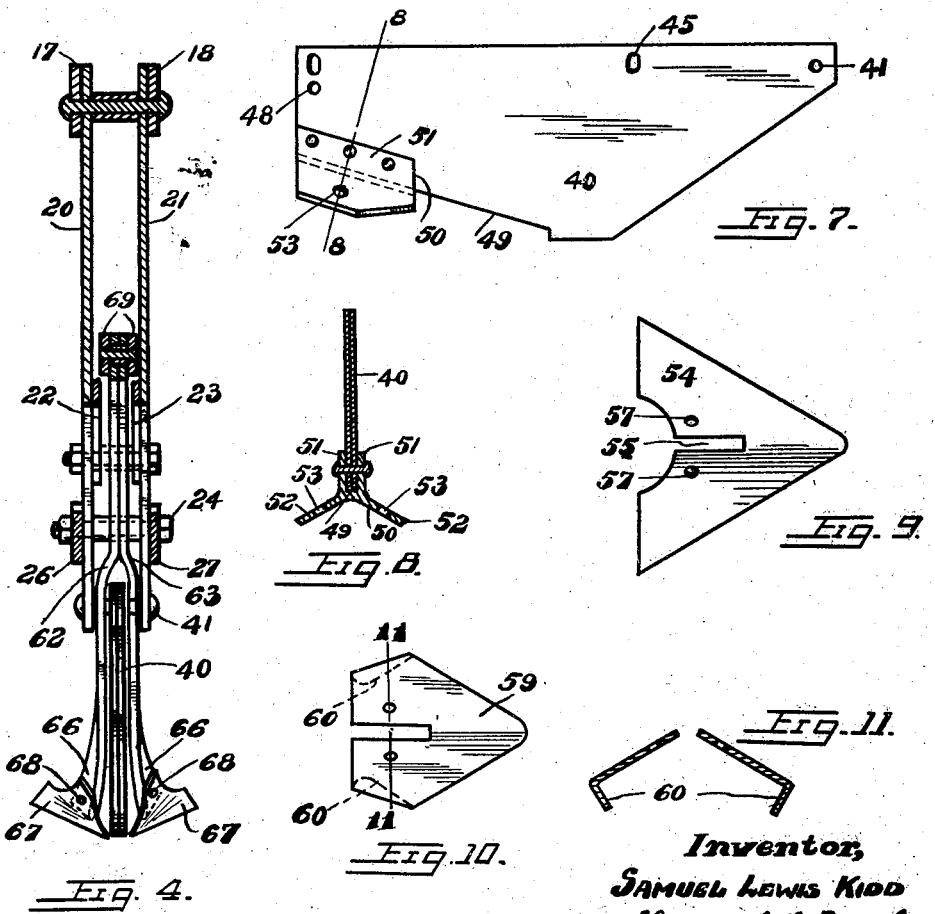

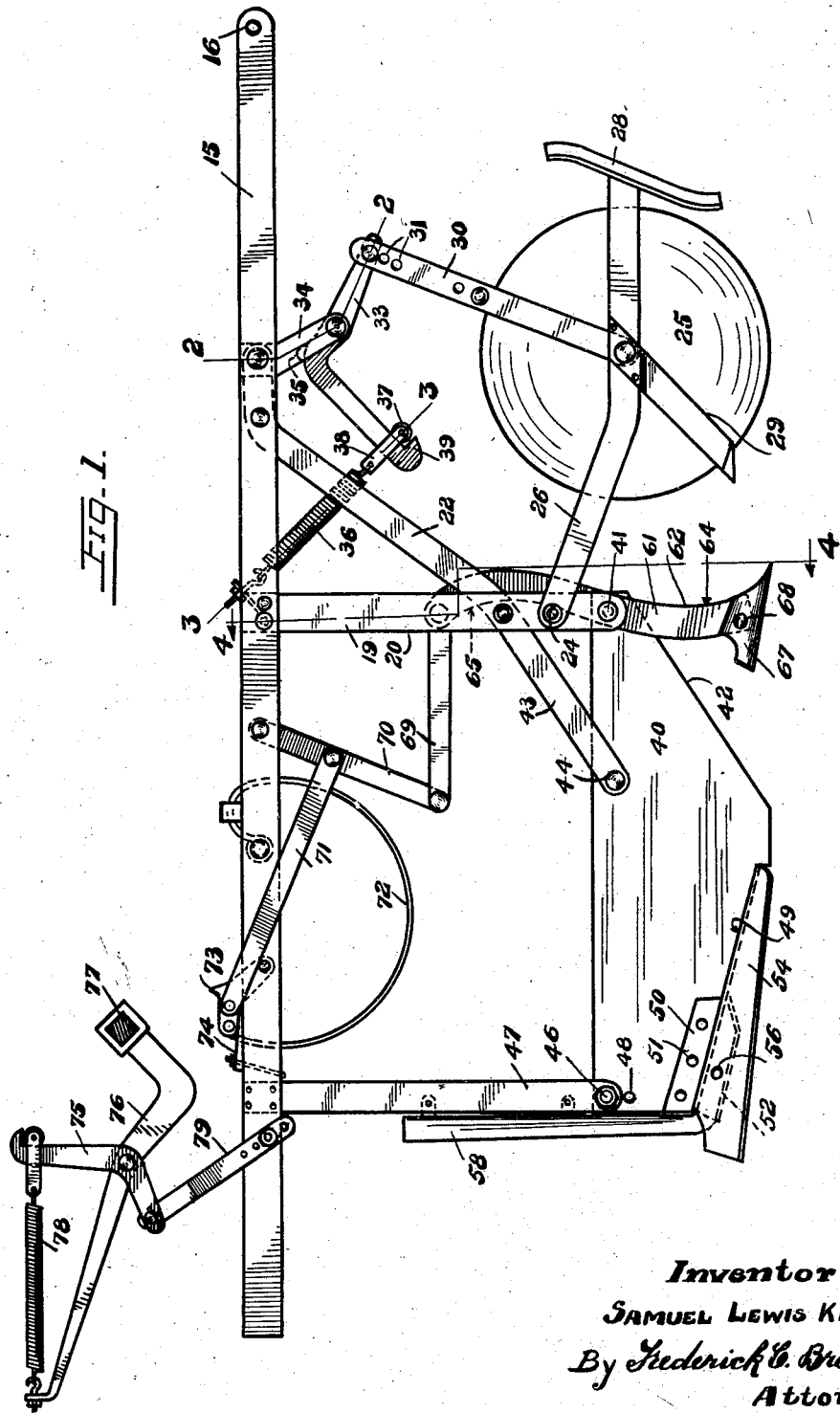

Patented May 27, 1930

1,759,854

UNITED STATES PATENT OFFICE

SAMUEL LEWIS KIDD, OF LISTOWEL, ONTARIO, CANADA

CULTIVATOR

Application filed April 5, 1928. Serial No. 267,621.

The invention relates to improvements in cultivators as described in the present specification and shown in the accompanying drawings which form part of the same.

The invention has for its general object to provide a very efficient and serviceable cultivator, one which is not only of general utility but also is adapted for sowing seeds. For this purpose it is equipped with a seed tube for discharging seeds to the rear of the teeth.

A very salient feature of the invention resides in the novel construction and arrangement of safety tripping mechanism, other distinctive features of the implement will appear as the description proceeds.

Referring to the drawings, Figure 1 is a side elevation of the invention.

Figure 2 is a section taken on the line 2—2 thereof.

Figure 3 is a section taken on the line 3—3 thereof.

Figure 4 is a vertical section taken on the line 4—4 thereof.

Figure 5 is a side elevation of one of a pair of cultivator teeth.

Figure 6 is a front view thereof.

Figure 7 is a side elevation of a large shoe which is straddled by the teeth just mentioned and their supporting elements.

Figure 8 is a section taken on the line 8—8 of this shoe.

Figure 9 is a plan view of a tooth carried by this shoe.

Figure 10 is a plan view of a slightly modified form of tooth that replaces that shown in Figure 9 for the purpose of exterminating quack grass.

Figure 11 is a cross section thereof taken on the line 11—11.

Like numerals of reference indicate corresponding parts in each of the figures throughout the drawings.

In the drawings, the reference numeral 15 generally denotes the usual frame, of which there are a complement, for carrying the teeth. This frame is swivelled at its frontal extremity 16 to the wheeled frame of the cultivator—not shown.

In the present instance this frame is composed of a pair of spaced members 17, 18, rigidly secured together. Approximately midway of the length thereof is a hanger 19 likewise consisting of a pair of members, which are indicated by the numerals 20, 21, and secured together at different points throughout their length. These members are fixedly secured to the frame 15 at their upper ends and are strengthened by a pair of braces 22, 23, extending angularly from said frame.

Pivotally mounted at 24 to the lower end of the hanger is a rolling coulter 25, which coulter is forwardly attached by the spaced bars 26, 27, one on each side thereof. The frontal ends of these bars are prolonged in advance of the rotary coulter in order to carry an inclined guard 28 that diverts trash and the like to one side. The coulter is scraped by a scraper 29 turned inwardly for this purpose.

The coulter is held in a working position by a safety trip device comprising arms 30 swivelly attached to the coulter axle and directed upwardly therefrom past the periphery of the coulter. Holes 31 are provided in the distal portion for selective pivoting to an end of the bent lever 33 that is pivotally supported medially of its length by a bracket 34 in the frame 15. The other end is yieldably held against a stop 35 by means of a substantial spring 36. One end of the spring is connected to the frame 15, while the other end is supplied with a roller 37 fitted between two plates 38. The roller presses against the lever and normally abuts the stop 39 at its outer end, the spring and lever being so disposed that the direction of pull is perpendicular to the length of the latter.

By this construction, upon the rotary coulter encountering an obstruction such as a stone, the spring yields permitting the coulter to rise, this upward movement resulting in the lever assuming an acute angle to the spring; consequently the roller moves towards the fulcrum point of the lever and thus decreases the purchase making it much easier for the coulter to ride over the obstruction.

40 designates a shoe that follows in the channel cut by the coulter. Said shoe consists preferably of two vertical plates placed side by side and secured at 41 intermediate of the lower extremities of the members 21, 22, of the hanger 19. The shoe recedes as at 42 from this frontal connection. The braces 22, 23, are prolonged at their lower ends as at 43 to connect with the shoe at 44, the shoe being provided with a slot 45, Figure 7, for this purpose.

The rear of the shoe is connected by a bolt 46 to hanger members 47 similar to those of the hanger 19. The shoe may be tilted at its rear end by removing the bolt 46 and replacing it in a neighbouring hole 48.

The rear half of the shoe has its bottom edge cut off at an angle as at 49. Riveted to the edge portion is a casting 50 that has a lengthwise slot to receive the shoe, providing flanges 51 which receive the rivets. This casting has downwardly and outwardly extending sides 52 pierced as at 53; see Figure 8.

54 is a tooth slotted at 55 to fit over the casting 50 and rest upon its sides 52. The tooth is secured by means of bolts 56 lodged in apertures 57 therein and the apertures 53 of the casting sides 52. The rear of this tooth is cut away to clear a seed tube 58. The tooth is detailed in Figure 9.

The seed tube is removably attached in order that it may be removed when the cultivator is not in use as a seeder, in which case the tooth 54 cultivates the soil.

The tooth 59 detailed in Figures 10 and 11 is intended to be mounted on the shoe instead of the tooth 54 to exterminate quack grass and the like. The construction is substantially the same with the exception that the tips 60 are turned under with a view to cutting up the quack grass.

Pivotally mounted at 41 in the hanger 19 is an erect fork 61 composed of a pair of bars 62 and 63 contiguously united at their upper half and offset at their lower half to fit astride the shoe 40. The lower half is forwardly curved as at 64 whilst the upper half is rearwardly curved as at 65 and is situated between the members of the hanger 19. The lower ends of the fork are outwardly curved as at 66, see Figure 4. Each curved end is provided with a tooth 67 that is bolted thereto as at 68. These teeth are pointed and incline upwardly and outwardly as best shown in Figure 4.

A pair of links 69 are pivotally connected to the upper end of the fork 61 and similarly attached to a further link 70 at an angle thereto. This latter link is pivoted to the frame 15 and intermediate of its length it is swivelled to rods 71 of a well-known type of safety trip comprising the arcuate spring 72 and swingable member 73 that is held off dead centre by the wedge 74—discernible in Figure 1 only.

In the use of this invention, the teeth 67 cultivate the soil upon each side of the shoe 40. In the event of their striking a stone or other obstruction the link connection transmits the strain to the spring 72 which yields in the well-known manner resulting in the fork 61 turning on its fulcrum 41 thus allowing the teeth to drag over the obstruction.

With a view to providing for the shoe 40 yielding upon its encountering an obstruction, the frame 15 is preferably equipped with a safety trip device similar to that described in connection with the rolling coulter 25. In this case, however, the lever 75 is carried by an arm 76 rigidly affixed to the wheeled frame as at 77 while the spring 78 is tied to the distal end of the arm. A link 79 pivotally connects the said lever to the rear of the frame 15 and in this manner it is held in a working position.

What I claim is:—

In a cultivator, a frame, a vertical shoe attached thereto, said shoe gradually receding from its frontal extremity to present an inclined working edge, the rear portion of the shoe having its bottom edge cut off at an angle, and a tooth having its tips bent downwardly and inwardly to exterminate quack grass.

Signed at Listowel, Ont., Canada, the 27th day of March, 1928.

SAMUEL LEWIS KIDD.